(12) United States Patent  
Boll (10) Patent No.: US 10,179,462 B2  
(45) Date of Patent: Jan. 15, 2019

(54) GENERATION OF SPOT COLORS WITH REDUCED INK SUBSETS

(71) Applicant: Electronics for Imaging, Inc., Fremont, CA (US)

(72) Inventor: Harold Boll, Arlington, MA (US)

(73) Assignee: ELECTRONICS FOR IMAGING, INC., Fremont, CA (US)

(*) Notice: Subject to any disclaimer, the term of this patent is extended or adjusted under 35 U.S.C. 154(b) by 0 days.

(21) Appl. No.: 15/599,405

(22) Filed: May 18, 2017

(65) Prior Publication Data

US 2018/0043701 A1 Feb. 15, 2018

Related U.S. Application Data

(60) Provisional application No. 62/373,918, filed on Aug. 11, 2016.

(51) Int. Cl.  
*C09D 11/40* (2014.01)  
*B41J 2/21* (2006.01)  
*H04N 1/54* (2006.01)

(52) U.S. Cl.  
CPC ............. *B41J 2/2107* (2013.01); *C09D 11/40* (2013.01); *H04N 1/54* (2013.01); *B41J 2/211* (2013.01)

(58) Field of Classification Search  
CPC .......... B41J 2/2107; B41J 2/211; C09D 11/40; H04N 1/54  
See application file for complete search history.

(56) References Cited

U.S. PATENT DOCUMENTS

| | | | |
|---|---|---|---|
| 5,563,724 A | * | 10/1996 | Boll .................. H04N 1/54 347/43 |
| 6,226,103 B1 | | 5/2001 | Klassen et al. |
| 7,933,053 B2 | | 4/2011 | Dalal et al. |
| 7,990,592 B2 | | 8/2011 | Mestha et al. |
| 8,280,161 B2 | | 10/2012 | Dalal et al. |
| 2008/0043263 A1 | | 2/2008 | Hancock et al. |

* cited by examiner

*Primary Examiner* — Yaovi M Ameh  
(74) *Attorney, Agent, or Firm* — Perkins Coie LLP (57) ABSTRACT

Optimization of ink recipes for spot colors in printers. Often, ICC Profiles are optimized for smooth rendering of images; thus, color recipes often contain more inks than are required for matching a color when generated from a Profile. When transitioning from one color to another, it is better to make smaller changes in inkings. This goal is not served when printing spot colors. Spot colors are often single, solid colors that do not vary in gradients from one to another. Herein is a discussion including dividing an N-ink set into subsets, generating an ink recipe for a desired recipe in each ink subset, and selecting a subset based on predetermined criteria. Where a spot color is out of Gamut, that color is mapped to the Gamut.

18 Claims, 7 Drawing Sheets

Recipes for Pantone Hexachrome CMYKOG Inkset $L^*a^*b^* = 50\ 25\ 25$

| Inkset | C | M | Y | K | O | G | dE |
|---|---|---|---|---|---|---|---|
| GYOKmaxK | 0 | 0 | 0 | .58 | .70 | 0 | .40 |
| GYOKfracK | 0 | 0 | 0 | .58 | .70 | 0 | .40 |
| GYOKminK | 0 | 0 | 0 | .58 | .70 | 0 | .40 |
| YOMKmaxK | 0 | .04 | .03 | .58 | .70 | 0 | .00 |
| YOMKfracK | 0 | .26 | .37 | .54 | .59 | 0 | .03 |
| YOMKminK | 0 | .63 | .71 | .44 | 0 | 0 | .00 |
| CMYKmaxK | 0 | .63 | .70 | .43 | 0 | 0 | .06 |
| CMYKfracK | .29 | .68 | .75 | .22 | 0 | 0 | .02 |
| CMYKminK | .43 | .72 | .79 | 0 | 0 | 0 | .00 |

| | C | M | Y | K | O | G | dE |
|---|---|---|---|---|---|---|---|
| Full inkset recipe | .29 | .57 | .63 | .28 | .40 | .07 | .02 |

GENERATION OF SPOT COLORS WITH REDUCED INK SUBSETS

CROSS REFERENCE TO RELATED APPLICATION

This application claims benefit of U.S. Provisional Patent Application No. 62/373,918, filed Aug. 11, 2016, which is incorporated herein in its entirety by this reference thereto.

TECHNICAL FIELD

Teachings relate to operating a printer. Teachings more particularly relate to generating spot colors recipes with the fewest number of inks ink needed to achieve the target color.

BACKGROUND

Spot colors are a specific important color, such as those in corporate logos. These colors are generally defined by a color characterization value such as L*a*b* value. One can specify these colors on a printer using a profile described by the International Color Consortium (ICC) specification. However, ink profiles are optimized for smooth rendering of images, thus recipes may contain more inks than are required for matching a spot color. Recipes with fewer inks are less prone to color variation as a result of system and image noise than are recipes with a greater number of inks.

INCORPORATION BY REFERENCE

U.S. Pat. No. 7,411,701, titled "N-Colorant Gamut Construction" is incorporated by reference in its entirety for all purposes.

SUMMARY

Embodiments describe improving the ink efficiency of printers when printing spot colors. Where printers have many chromatic inks available, printing a given single color with a recipe that makes use of all available inks is inefficient. Where a printing task calls for a single color rather than a gradient, using fewer inks is better. Therefore, use of subsets of the inks available to a printer is most efficient when printing spot colors.

Not every subset of inks will be able to print the spot color, and not every subset that can print the ink does so favorably or accurately. The preferred subset is that which has a recipe for the spot color that uses the most of a dominant ink. The dominant ink is determined based on the order arrangement of the chromatic inks in the subset. Chromatic inks are arranged in a color wheel where the three subtractive primary inks (cyan, magenta, and yellow) are positioned about the wheel and other RGB overprint colors—are positioned between the adjacent subtractive primaries from which they are derived. The dominant ink is the ink that is positioned in the middle of the chromatic inks in a given subset.

In addition to determining a preferred subset, a black ink scheme is determined. The black ink scheme is also known as Gray Component Replacement (GCR). A given subset of inks can produce a number of recipes that generate the chosen spot color based on the amount of black ink used. The black ink scheme varies based on a number of predetermined settings (such as max-K or min-K), user choice, or thresholds.

DETAILED DESCRIPTION

In a Profile based rendering of an image, inkings from a B2Ax transform are optimized for smooth rendering of images. Consequently any spot color recipes derived from the B2A3 transform often contain more inks than are required for matching a discrete color. When transitioning from one color to another, it is better to make smaller changes in recipes in order to print smooth transitions. This goal is not served when printing spot colors. Spot colors are often isolated, and thus accuracy is more important than transitional smoothness. Among other advantages, optimizing spot color recipes enables the printer to increase accuracy, reduce potential for printer/system error, and utilize maximum Gamut.

Figure 1:
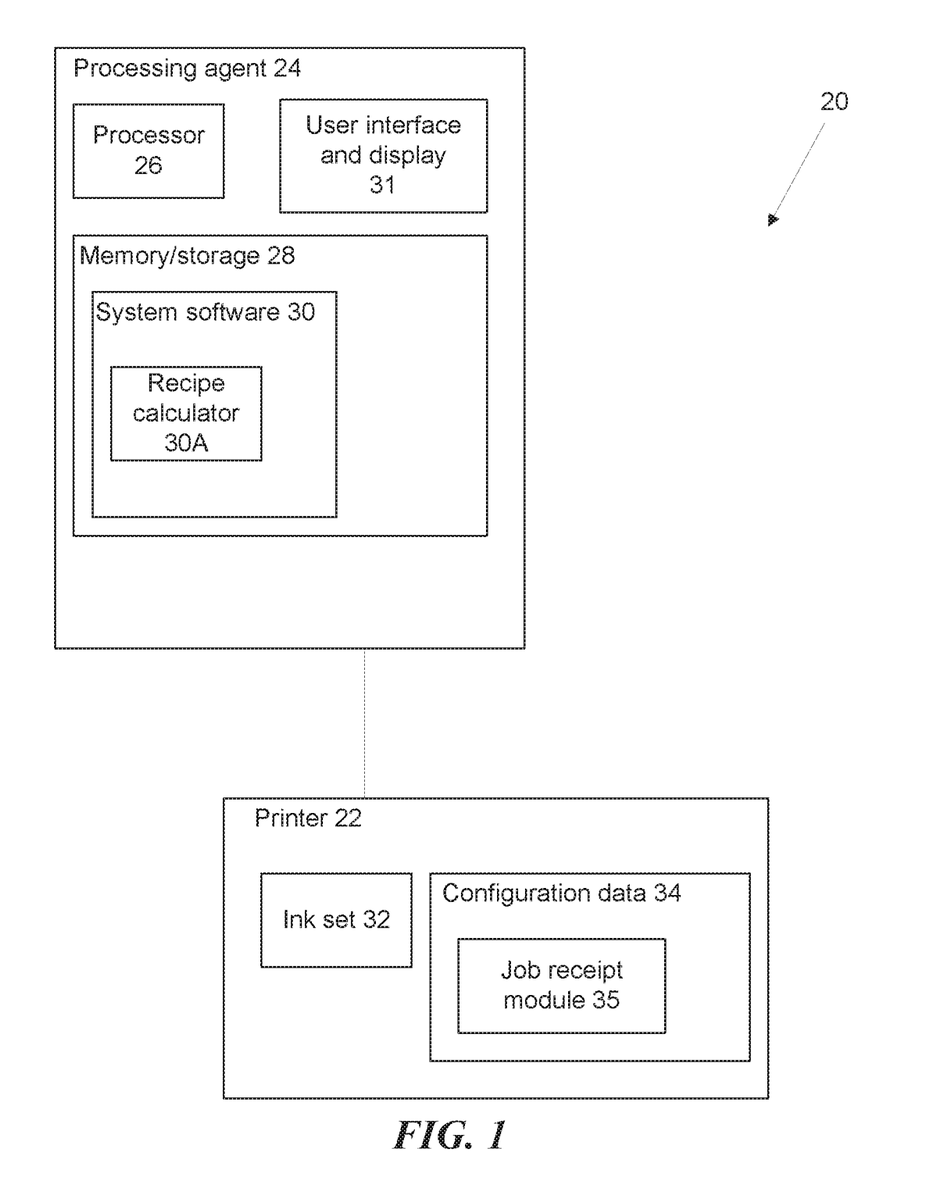
FIG. 1 is an illustrative block diagram of a printer system.

FIG. 1 is an illustrative block diagram of a printer system 20. A printer system 20 includes a printer 22 and a processing agent 24. The processing agent 24 provides the printer 22 with processing support to perform calculations, accept and deliver instructions for print jobs, and interact with users. The processing agent 24 can be a computer, a network server, processing integrated inside the printer 22, or another suitable processing solution known in the art. The processing agent 24 may comprise a network, or a plurality of computational resources.

The processing agent 24 includes a processor 26, along with memory and digital storage 28. The memory and digital storage 28 includes printer software 30 which manages the operations of the printer 22 and includes a recipe calculator 30A to calculate ink recipes for a given color. The processing agent 24 additionally includes a user interface and display 31. The user interface and display 31 may comprise, keyboards, touchscreens, a mouse, display screens, button panels, peripheral controls, or other suitable known control and display devices known in the art.

The printer 22 includes an ink set 32, and configuration data 34. The ink set 32 includes a number of inks. This number varies between printers. Color printers typically include chromatic inks and black ink. The simplest of these is the four-ink set, "CMYK." This set includes 3 chromatic inks, cyan (C), magenta (M), and yellow (Y), as well as black (K). Other ink sets include a greater number of inks such as "CMYKRGB" (the addition of red, green, and blue inks). The configuration data 34 interfaces with the printer software 30 to operate the printer 22 and receives print jobs at a job receipt module 35.

The available inks determine the gamut of the printer. The gamut represents all colors reachable by a given ink set 32. Different devices have different gamuts, meaning different abilities to print more or fewer colors. High-quality devices have bigger gamuts. A gamut is computed as a three-dimensional object.

Colors are defined by a color characterization value such as L*a*b* value, a Pantone number, or other known color characterization values known in the art. For example, the L*a*b* value, 50, 25, 25, is a particular shade of red-orange. Depending on the printer ink set 32 this color may or may not be in gamut.

If a color is out of gamut, the printer then must choose a color in or on the gamut that is going to best represent the out-of-gamut color. This is called gamut mapping, the process of locating that out-of-gamut color and mapping it to some point in or on the gamut, that is the representation of the out-of-gamut color. If a color is in gamut and if the printer has, for example, CMYK, the printer determines a particular ratio of CMY and K that represents that color which is known as a recipe.

When black is included, there is gray component removal, which can vary the amount of black for a given color formulation. Increasing black leads to decreasing the amount of CMY while still printing the same color, or vice versa. Increasing CMY and reducing the amount of black, still prints the same color. For this reason, full color printing, using chromatic inks and black, is challenging.

The scheme involves a selection of a range of blacks. On one end, there 'is a min-K solution, which is' the minimum amount of black used with the chromatic inks to still achieve the L*a*b* specified color. Conversely, the max-K solution is the most amount of black to use with the least CMY in comparison to the min-K solution. Any black in between is also a valid recipe. Thus far, this example has used CMYK, but GCR pertains to N-inks subsets as well.

Figure 2:
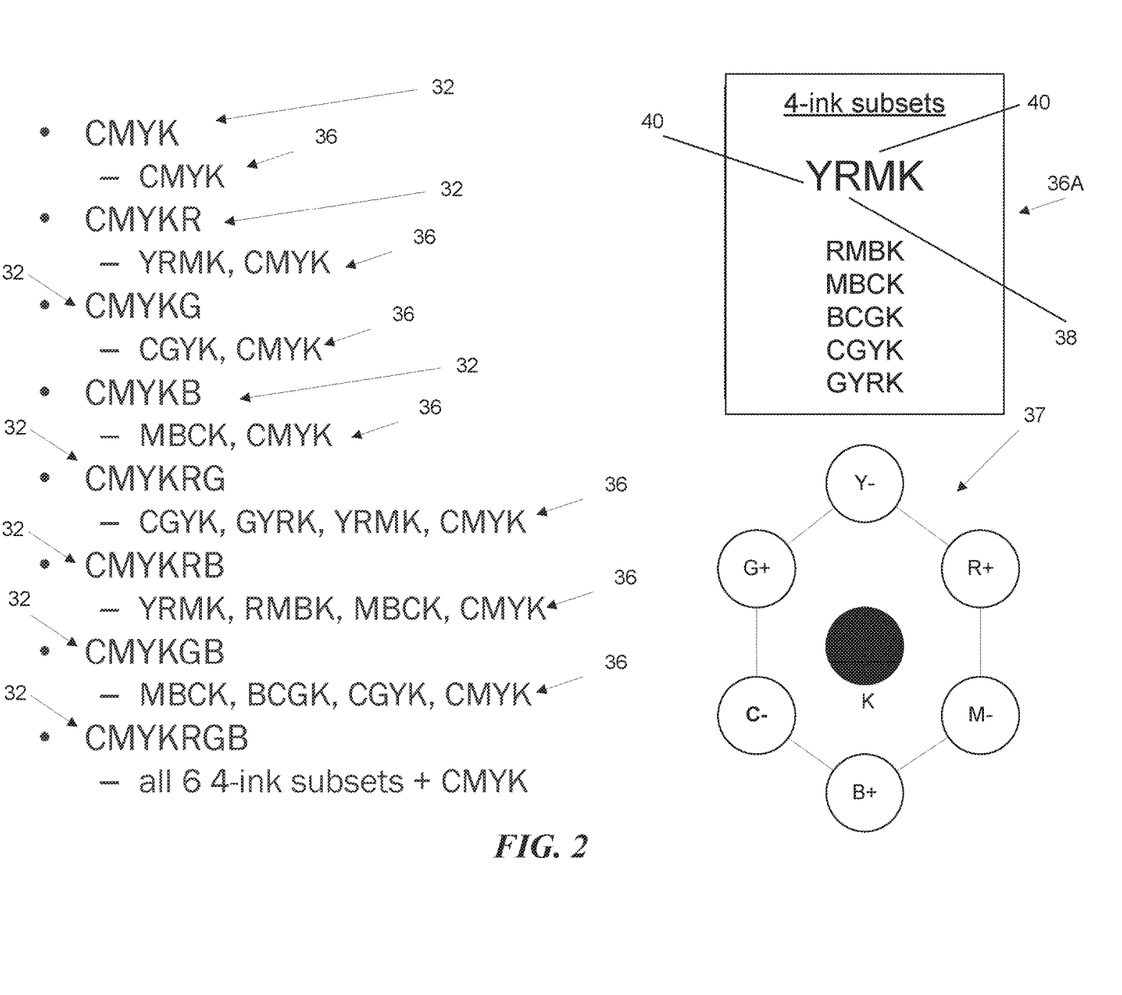
FIG. 2 is a chart of ink subsets based on a number of ink sets.

FIG. 2 is a chart of ink subsets based on a number of ink sets. As additional chromatic inks are added, the ink sets become more complicated as a result of deciding which inks to use in inking a color and in devising a coherent black strategy. Displayed here are up to six chromatic inks. Despite the increase in the choice of inks, using all of the inks to hit a single color is inefficient, and error prone. Using all seven inks for a color that could be hit with two or three inks is wasteful. In a general sense, the fewer inks, the better. Thus, the printer software 30 creates ink subsets 36.

With each N-ink set 32, ink subsets 36 include four-ink permutations created by the sequential order of three of the inks in the color wheel 37 shown in FIG. 2, plus black (K).

The hexagonal arrangement in the lower right of the figure represents a CMYKRGB color wheel 37. The arrangement of the color wheel 37 is to position CMY about the color wheel, with their 200% overprint colors positioned between their respective components (e.g. R between Y and M, B between M and C, and G between C and Y). Ink subsets 36 are determined as three chromatic inks, which are in sequential order around the color wheel 37, plus black. In the first example, which is merely CMYK (and thus does not include the additional colors shown in the color wheel 37), there are no additional ink subsets 36. The additional of additional inks increases the number of ink subsets 36.

The first example in subset legend 36A having a seven ink, ink set 32, shows the four-ink subset 36, YRMK. Y, R and M are three consecutive inks, plus black. This is one of the available ink subsets 36. The next ink subset 36 down rotates the color wheel 37 by one notch to the right and returns RMBK—in effect dropping Y and adding B.

For CMYKRGB ink set 32, there are six of these ink subsets 36 plus CMYK. In the smaller N-ink sets 32, there are fewer ink subsets 36; however, each one can be decomposed into three chromatic inks plus black. In some embodiments, ink subsets 36 may be larger or smaller than four inks.

Given a particular color and an N-ink set 32, each available ink subset 36 is tested to generate an inverted forward model (e.g., L*a*b* value to ink recipe). Normally, recipe generation is determined by a forward model, that is, system software 30 analyzes color patches of N-inks, and the forward model returns a series of L*a*b* values. Reversing the process, meaning, given an L*a*b*, the printer software 30 returns the inking. This method provides a means to test an ink subset 36.

In the present example, each ink subset 36 is a four-ink subset 36. Through testing, the system software 30 determines whether a particular ink subset 36 may successfully print the chosen L*a*b* value. If it turns out there's only one ink subset 36 that successfully prints the color, no further ink subset 36 based decisions need be made. If more than one ink subset 36 successfully prints the color, then subset selection rules are used to determine a preferred ink subset 36. Within an ink subset 36, recipes can also drive to a min-K solution or a max-K solution, as described above with CMYK.

However, because sub-gamuts may overlap, it is possible that a given L*a*b* can exist in two ink subsets 36. So, another determination needs to be made to pick an ink subset 36 in the event there is more than one successful Forward Model inversion to obtain a recipe. Each ink subset 36, has a dominant ink 38. The dominant ink 38 is the middle chromatic ink, sequentially, in each ink subset 36. For example, the top ink subset 36 in the ink subset legend 36A, YRMK, R is the dominant ink. R is flanked by Y and M on either side. Y and M are subordinate inks 40. The exception to this rule is that CMYK is not assigned a dominant ink 38.

Where a given spot color may be successfully printed by two or more ink subsets 36 of a given ink set 32 there is a method of determining an optimal ink subset 36. For example, in the N-ink set CMYKRGB, a spot color is successfully printed by both the YRMK ink subset, and the RMBK ink subset. In this example, each ink subset's ink recipes are compared. In each ink recipe, there will be a maximum ink. In some embodiments, the recipe where the maximum ink is the dominant ink, it is the preferred ink subset 36. In many cases, this optimal selection will be the ink subset 36, which uses the fewest number of inks.

In some embodiments, driving to a maxK solution will drive a chromatic ink to 0. Similarly, a min-K solution may result in no K ink at all. The process of driving to a min-K or a max-K solution, which you can do with any of these ink subsets, could yield three inks: two chromatic inks plus black, or no black.

Figure 3:
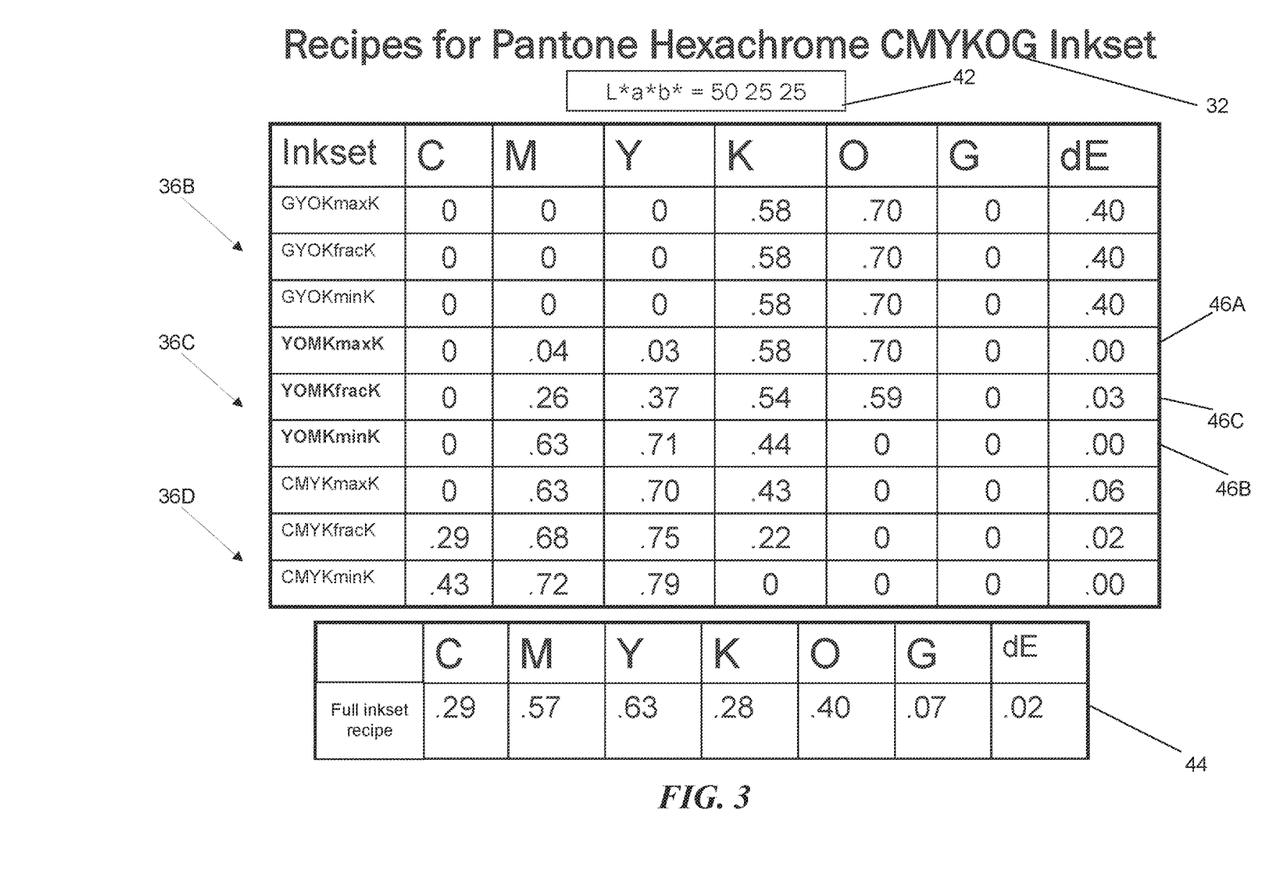
FIG. 3 is a chart of profile ink recipes for a given spot color and given ink set.

FIG. 3 is a chart of profile ink recipes for a given spot color and given ink set. In this particular case, the N-ink set is six inks, CMYKOG, five chromatic inks and black. In this example, O is positioned where R was in the color wheel 37 of FIG. 2. This chart shows testing values for a number of ink subsets 36 for a particular color 42, here defined by the L*a*b* value, 50 25 25. The full ink set recipe derived from a Profile 44 is shown at the bottom, requiring all six inks. Each ink recipe 46 includes a delta of error figure (dE). The dE is the error of the target Lab value from the computed L*a*b* value. The dE value for the recipe in the profile 44 is relatively low (0.02) for this particular example; however, the profile 44 is generally more prone to color variation and image noise.

After testing, solutions below threshold dE value (here under 0.5) exist in three of the four ink subsets where the specified Lab color is in gamut: GYOK 36B, the YOMK 36C, and the CMYK 36D. For each ink subset solution, the chart identifies three ink recipes 46 that are guided by different values for black (max 46A, min 46B, and a fraction in between 46C). In the case of YOMK 36C, O being orange, the maximum ink corresponds to the dominant ink (for two of the black values). With the max-K solution 46A, orange is at 70% and is the maximum ink, whereas yellow and magenta are at 3% and 4%, respectively. In the ink subset YOMK 36C, the chromatic middle ink, the dominant ink 38 is O, while Y and M are subordinate inks 40.

Comparatively, in GYOK 36B, orange is also at 70%, but orange is a subordinate ink 40. In this ink subset 36B, the dominant ink 38 is yellow. So the system software 30 rejects the GYOK 36B ink subset. As mentioned before, the basic CMYK does not have a dominant ink 38, so that ink subset 36D is also rejected.

Returning to the preferred ink subset 36C, the chart shows for a min-K solution 46B, the printer can hit the particular color 42 with just two chromatic inks: M, Y and K. Alternatively, the fractional solution uses four inks: M, Y, K, and O. The user has a choice between the profile ink recipes 46. This choice is presented in the printer software UI, or it is determined through preset thresholds or settings.

Given these options, the user may establish thresholds to determine which is the preferred ink recipe 46. Options in assigning thresholds may include GCR, chromatic ink elimination, real world conditions, the quality of the printer 22, site ink average usage, or other variables known in the art. As an example of rules to determine thresholds, certain ranges of black usage are more noticeable than others, especially in lighter L*a*b* values. Increasing black from near zero (0.03) to light usage (0.12) is more noticeable than the difference between mid-range uses of black (e.g., 0.44 and 0.58 as shown in recipes 46A, and 46B). Given that K values in recipes 46A and 46B are in a less noticeable range close, nearly eliminating the two chromatic inks M and Y is an optimal choice. Thus, the max-K choice 46A is the preferred profile ink recipe 46. As stated above, elimination of chromatic inks from a spot color recipe reduces color variance.

However, in many cases the min-K recipe 46B is optimal. Spot colors tend to be bright, vivid colors and users would rather avoid using black due to graininess issues or surface characteristics. As noted, with reference to lighter L*a*b*, K values ranged between 0.03 and 0.12, have a significant and noticeable visual difference. Accordingly, establishing thresholds for use cases, or preselecting from a number of settings having a selection of thresholds matching a particular printing or appearance goal, enables the user to configure the printer system 20.

Figure 4:
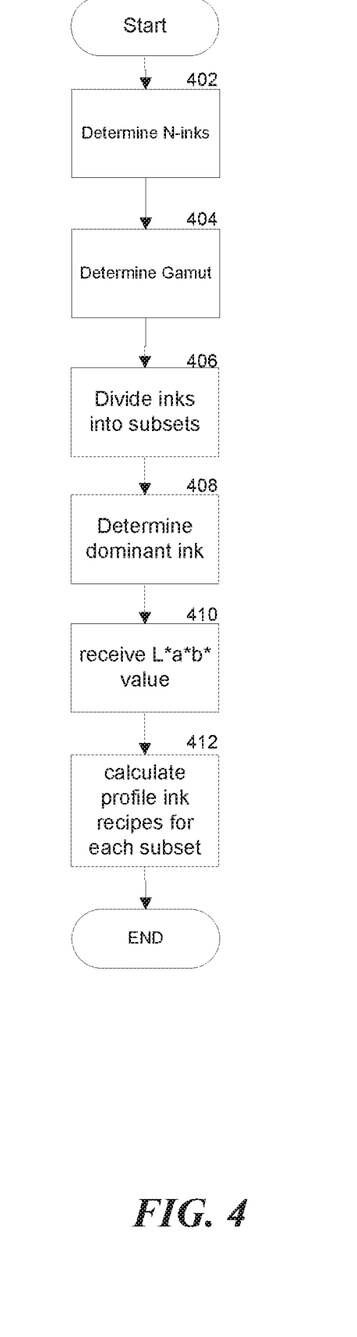
FIG. 4 is a flowchart illustrating a method of inverting a forward model.

FIG. 4 is a flowchart illustrating a method of inverting a forward model. In step 402, the printer or system software determines the number of inks available to the printer. In step 404, the printer determines its respective Gamut based on the inks available. This can be done through generation of a first forward model, and Gamut construction In step 406, the printer or system software divides the ink set into ink subsets. Each ink subset has at least one less ink than the total ink set. Further, the ink subsets are order-specific permutations. An exception to this rule is where the ink set is just CMYK, and the ink subset may also be CMYK. In some embodiments, ink subsets are chosen by organizing chromatic inks available in the set of inks in a circular, linked order (a color wheel), then generating a first ink subset from a predetermined of number of consecutive chromatic inks, and adding black to the end. Subsequent ink subsets are determined by incrementing the previous selection of chromatic inks by one in the chromatic color wheel.

In step 408, the printer or printer software determines the dominant ink in each ink subset. The dominant ink is determined based on the order of the inks in each ink subset 36. In step 410, the printer or printer software receives a particular spot color specification identified by a color characterization value. The color may be identified by such means as an L*a*b* value, a pantone number, or other colorometric specification (i.e. XYZ, uvL, L*u*v*, etc). When a full ink set recipe is provided that can be altered into another form of color characterization, this input is also acceptable.

In step 412, the printer or printer software calculates ink recipes for each ink subset to generate the particular color. Each ink subset may have a range of values for black ink, that shifts the use of the rest of the inks in the ink subset, thereby creating a number of ink recipes per ink subset.

Figure 5:
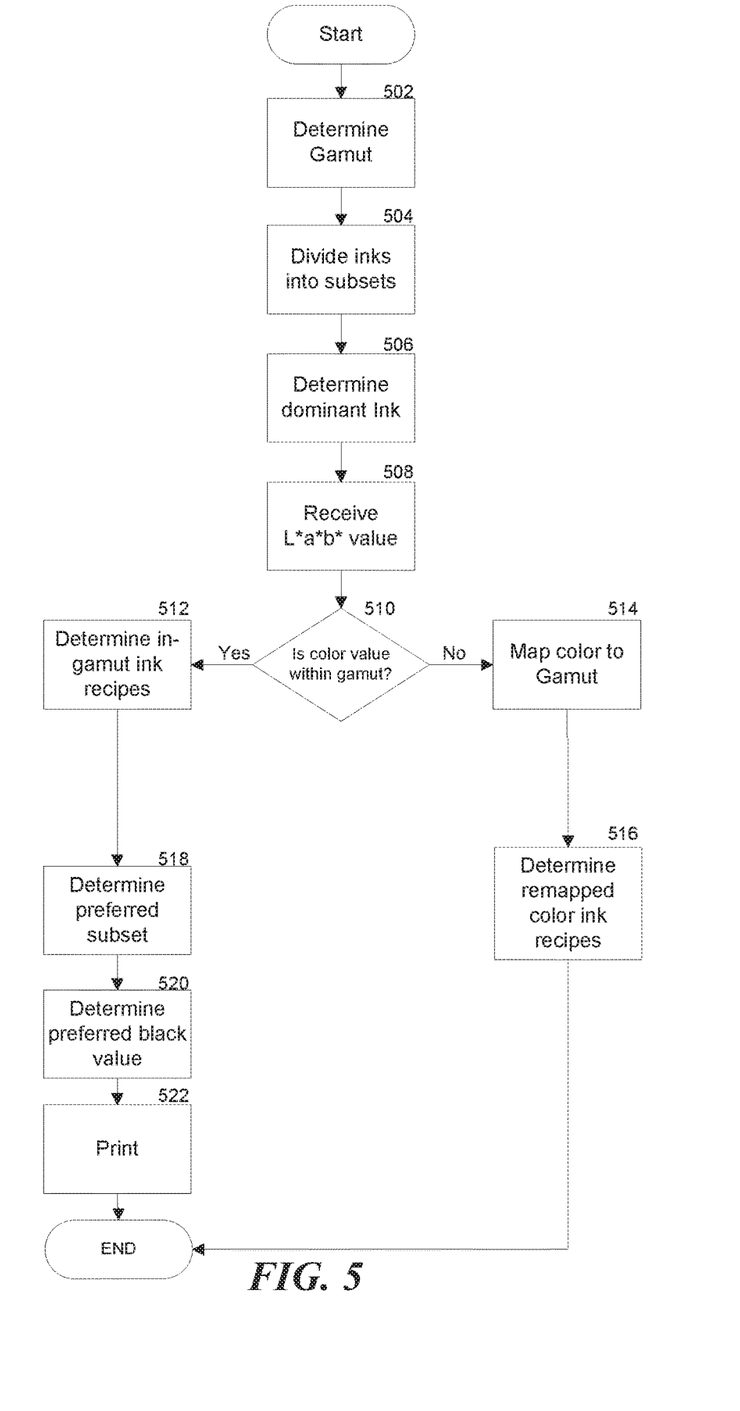
FIG. 5 is a flowchart illustrating a method for subset ink recipe generation and selection.

FIG. 5 is a flowchart illustrating a method for subset ink recipe generation and selection. Step 502 to step 508 operate similarly to the method of FIG. 4. In step 510, the system determines whether the color characterization value is within the Gamut of the printer. If yes, in step 512 the system generates in-Gamut recipes via by inverting the forward model for each of the ink subsets. If not, in step 514, the color characterization value is mapped to the surface of the Gamut. Then, in step 516, the system generates ink recipes for the remapped color characterization value.

In step 518, the printer or system software determines the preferred ink subset. This occurs by rejecting the ink subsets for which no ink recipe is capable of generating the particular color within a predetermined range of variance (threshold dE). Further, step 518 includes rejecting ink subsets that do not call for the greatest usage of the dominant ink.

In step 520, the printer or system software determines which value of black to use for the remaining ink subset. The preferred value of black may follow a max-K, min-K, or an in-between solution for black ink. Step 520 is determined through user settings, use of thresholds, or predetermined defaults. In step 522, once the preferred ink subset and the preferred ink recipe (including black scheme) are determined, the printer prints the color as directed.

Figure 6:
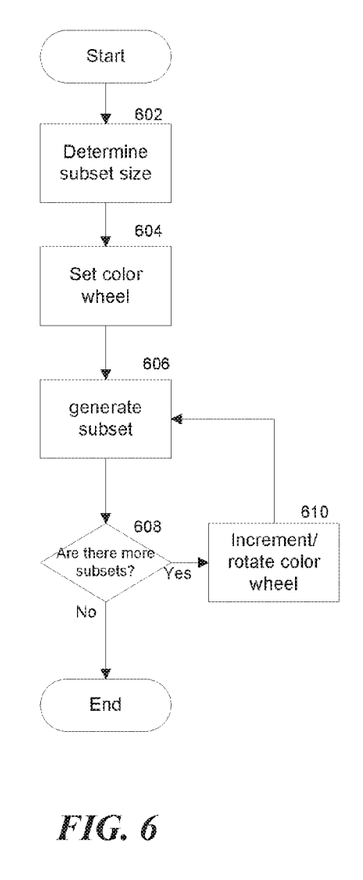
FIG. 6 is a flow chart illustrating generation of ink subsets.

FIG. 6 is a flow chart illustrating the generation of ink subsets. In step 602, the printer or system software determines the number of ink subsets derived from the N-ink ink set. In some embodiments, subsets include four inks (three chromatic and black), though any number less than the total number of inks available in the ink set may be used. In step 604, the chromatic inks (all inks except black) of the ink set 32 are arranged sequentially by color in a color wheel.

In some embodiments having 6 chromatic inks, the subtractive primary inks, C M Y, are laid out at the vertices of an equilateral triangle. The respective 200% overprint colors, R B G, are then positioned adjacent to their parent primaries. This arrangement yields an overall hexagonal layout. Black is placed in the middle to indicate that it is common to all the ink sub sets.

In step 606, the printer or system software generates an ink subset. The selected number of sequential chromatic inks and black (K) are saved as an ink subset based on the size determined in step 602. In step 608, if there are more permutations of chromatic inks remaining, in step 610, the color wheel is incremented once thereby sequentially shifting one chromatic ink out of the subset and another chromatic ink in as a replacement. Then the next ink subset is saved.

Figure 7:
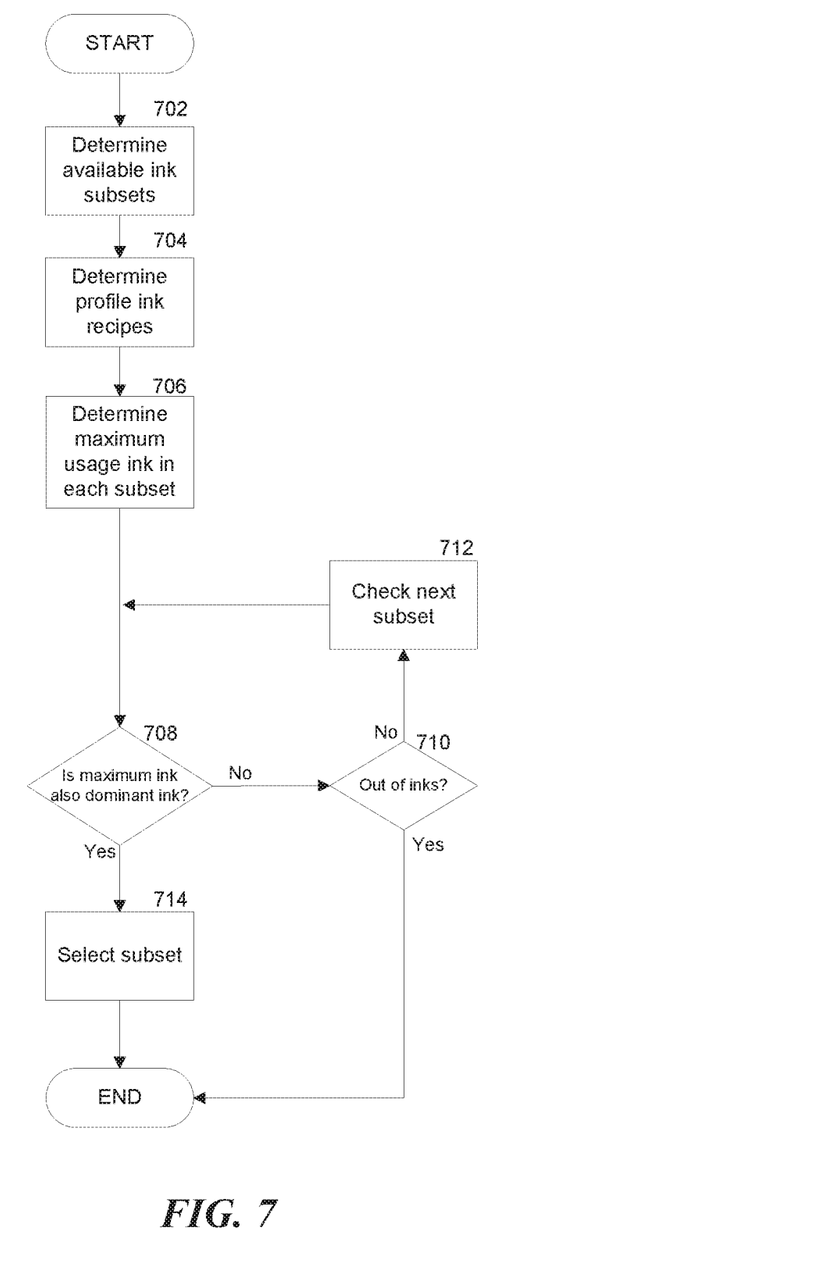
FIG. 7 is a flow chart illustrating the selection of an ink subset.

FIG. 7 is a flow chart illustrating the selection of an ink subset. In step 702, the system determines the available ink subsets. In step 704, given the available ink subsets, the printer system calculates ink recipes available for each ink subset to print a particular color. In step 706, each ink recipe is examined for the maximum ink.

In step 708, the printer system determines if the maximum ink of an ink recipe is also the dominant ink in the ink subset. Where the dominant ink is not also the maximum ink, if there are more inks left (710), in step 712, the system checks the next ink recipes of the next ink subset. In step 714, if the maximum ink matches the dominant ink of an ink subset, then that ink subset is selected by the printer.

The invention claimed is:

1. A method for selecting a spot color formula in a printer, the method comprising:
dividing a set of inks into ink subsets, each ink subset having at least one less ink than the set of inks and where each ink in each subset is order-specific, the subsets including a CMYK subset;
determining a dominant ink to each ink subset, wherein cyan, magenta, and yellow are each considered dominant inks in the CMYK subset;
receiving a particular color identified by a color characterization value;
calculating ink recipes for each ink subset to generate the particular color;
rejecting from selection ink subsets that cannot generate the particular color within a predetermined range of variance, wherein the predetermined range of variance is no greater than 0.5 from the color characterization value; and
selecting a preferred ink subset for printing the particular color, where a preferred ink subset is that ink subset within the remaining non-discarded ink subsets wherein at least one of the calculated ink recipes calls for the maximum usage of the dominant ink, and wherein cyan, magenta, and yellow are each considered dominant inks in the CMYK subset.

2. The method of claim 1, further comprising:
selecting a preferred ink recipe from those calculated for the preferred ink subset.

3. The method of claim 1, wherein each ink subset includes the same number of inks.

4. The method of claim 1, wherein the dominant ink is assigned based upon the position of that ink relative to other inks within the ink subset with the exception of black ink.

5. The method of claim 4, wherein said dividing step includes:
organizing chromatic inks available in the set of inks in a circular, linked order;
generating the first ink subset from a predetermined of number of consecutive chromatic inks, and adding black to the end when available in the set of inks;
generating subsequent ink subsets by rotating the predetermined number of consecutive inks around the circular linked order of chromatic inks one at a time and adding black to the end; and
wherein the dominant color is assigned as an ink within each ink subset that is in the middle of the consecutive chromatic inks.

6. The method of claim 2, wherein ink recipes calculated for each ink subset vary based on predetermined schemes of black ink usage.

7. The method of claim 6, wherein the schemes of black usage include:
min-k; and
max-k.

8. A printer system for using reduced subsets of inks available to produce spot colors, comprising:
a set of inks which is divided into a plurality of ink subsets, each ink subset having at least one less ink than the set of inks and where each ink in each subset is order-specific, the subsets including a CMYK subset, each ink subset having an assigned dominant ink and wherein cyan, magenta, and yellow are each assigned dominant inks for the CMYK subset;
a job receipt module which receives print requests for the printer including a particular color identified by a color characterization value other than an ink recipe; and
a recipe calculator which generates ink recipes for each ink subset to generate the particular color and selects a preferred ink subset for printing the particular color, where the recipe calculator is configured to determine a preferred ink by discarding ink subsets that cannot generate the particular color within a predetermined range of variance and then subsequently selecting a non-discarded calculated ink recipe that calls for the maximum usage of the dominant ink, wherein the predetermined range of variance is no greater than 0.5 from the color characterization value.

9. The system of claim 8, wherein the recipe calculator additionally selects a preferred ink recipe from those calculated for the preferred ink subset.

10. The system of claim 8, wherein each ink subset includes the same number of inks.

11. The system of claim 8, wherein the dominant ink is assigned based upon the position of that ink relative to other inks within the ink subset with the exception of black ink.

12. The system of claim 11, wherein the set of inks is divided into ink subsets by:
organizing chromatic inks available in the set of inks in a circular, linked order;
generating the first ink subset from a predetermined of number of consecutive chromatic inks, and adding black to the end when available in the set of inks;
generating subsequent ink subsets by rotating the predetermined number of consecutive inks around the circular linked order of chromatic inks one at a time and adding black to the end; and
wherein the dominant color is assigned as an ink within each ink subset that is in the middle of the consecutive chromatic inks.

13. The system of claim 9, wherein ink recipes calculated for each ink subset vary based on predetermined schemes of black ink usage.

14. The system of claim 13 wherein the schemes of black usage include: min-k; and max-k.

15. A method for selecting a spot color formula in a printer, the method comprising:
dividing a set of inks into ink subsets, each ink subset having at least one less ink than the set of inks and where each ink in each subset is order-specific, the subsets including a CMYK subset;
determining a dominant ink to each ink subset, wherein cyan, magenta, and yellow are each considered dominant inks in the CMYK subset;
receiving a particular color identified by a color characterization value;
calculating ink recipes for each ink subset to generate the particular color;

determining that the particular color is outside of a gamut for each of the ink subsets;

re-mapping the particular color to the gamut of the printer such that the particular color is in-gamut for at least one of the ink subsets;

rejecting from selection ink subsets that cannot generate the particular color within a predetermined range of variance, wherein the predetermined range of variance is no greater than 0.5 from the color characterization value; and selecting a preferred ink subset for printing the particular color, where a preferred ink subset is that ink subset within the remaining non-discarded ink subsets wherein at least one of the calculated ink recipes calls for the maximum usage of the dominant ink.

16. The method of claim 15, wherein the predetermined range of variance is determined with respect to said color characterization value.

17. The method of claim 16, wherein the range of variance of each ink recipe is calculated from the color characterization value prior to re-mapping the gamut.

18. The method of claim 16, wherein the range of variance of each ink recipe is calculated from the color characterization value after the re-mapping of the gamut.

* * * * *